United States Patent
Smart (10) Patent No.: US 8,007,386 B2
(45) Date of Patent: Aug. 30, 2011

(54) BLADE TENSIONER WITH OPPOSING SPANS

(75) Inventor: Michael Smart, Locke, NY (US)

(73) Assignee: BorgWarner Inc., Auburn Hills, MI (US)

( * ) Notice: Subject to any disclaimer, the term of this patent is extended or adjusted under 35 U.S.C. 154(b) by 550 days.

(21) Appl. No.: 12/278,430

(22) PCT Filed: Jan. 24, 2007

(86) PCT No.: PCT/US2007/060941
§ 371 (c)(1),
(2), (4) Date: Aug. 6, 2008

(87) PCT Pub. No.: WO2007/092674
PCT Pub. Date: Aug. 16, 2007

(65) Prior Publication Data
US 2009/0036243 A1    Feb. 5, 2009

Related U.S. Application Data (63) Continuation-in-part of application No. PCT/US2007/060945, filed on Jan. 24, 2007, and a continuation-in-part of application No. PCT/US2007/060947, filed on Jan. 24, 2007.

(60) Provisional application No. 60/863,815, filed on Nov. 1, 2006, provisional application No. 60/765,777, filed on Feb. 7, 2006, provisional application No. 60/822,520, filed on Aug. 16, 2006.

(51) Int. Cl.
F16H 7/08 (2006.01)

(52) U.S. Cl. ........................................ 474/111; 267/182

(58) Field of Classification Search ............... 474/111, 474/140, 109, 101; 267/158, 160, 164, 182
See application file for complete search history.

(56) References Cited

U.S. PATENT DOCUMENTS
2,191,946 A    2/1940    Weller
2,261,316 A    11/1941    Weller
(Continued)

FOREIGN PATENT DOCUMENTS
DE        1724655        6/1956
(Continued)

OTHER PUBLICATIONS
PCT Search Report; PCT/US2007/060945; May 3, 2007; 11 pages.
(Continued)

*Primary Examiner* — William A Rivera
*Assistant Examiner* — Juan Campos, Jr.
(74) *Attorney, Agent, or Firm* — Brown & Michaels, PC (57) ABSTRACT

A tensioner for tensioning a strand of chain between two sprockets including a tensioner body and a ramp fixed to ground. The tensioner body has an oval shape defined by first and second arcuately curved sides. Each side has a distal end, a proximal end, and a blade spring. The first and second arcuately curved sides are coupled together at the distal ends and pivotally attached to ground at the proximal ends. When the first arcuately curved side is in contact with the ramp, the second arcuately curved side is in contact with the chain strand, and the tensioner body is positioned relative to the ramp such that the blade springs of the tensioner body are compressed, a tensioning force is applied to the strand of chain.

14 Claims, 10 Drawing Sheets

U.S. PATENT DOCUMENTS

| | | | |
|---|---|---|---|
| 3,370,476 A | 2/1968 | Hill et al. |
| 3,985,379 A | 10/1976 | Normark |
| 4,325,470 A | 4/1982 | Bopp |
| 4,653,623 A | 3/1987 | Demorest |
| 4,921,472 A | 5/1990 | Young |
| RE34,616 E | 5/1994 | Komorowskip et al. |
| 5,462,493 A | 10/1995 | Simpson |
| 5,653,652 A | 8/1997 | Simpson |
| 5,797,818 A | 8/1998 | Young |
| 5,935,032 A | 8/1999 | Bral |
| 6,141,831 A | 11/2000 | Novin et al. |
| 6,264,578 B1 | 7/2001 | Ayukawa |
| 6,422,962 B1 | 7/2002 | Lehtovaara et al. |
| 6,428,435 B1 | 8/2002 | Kumakura et al. |
| 6,439,078 B1 | 8/2002 | Schlude et al. |
| 6,440,020 B1 | 8/2002 | Tada |
| 6,447,416 B1 | 9/2002 | Jacques et al. |
| 6,592,482 B2 | 7/2003 | Serkh |
| 6,612,953 B2 | 9/2003 | Tada |
| 6,699,148 B1 | 3/2004 | Taylor et al. |
| 2002/0045503 A1 | 4/2002 | Young et al. |
| 2002/0069539 A1 | 6/2002 | Tada |
| 2002/0162191 A1 | 11/2002 | Chen |
| 2003/0119616 A1 | 6/2003 | Meckstroth et al. |
| 2005/0059518 A1 | 3/2005 | Joslyn |
| 2005/0143207 A1 | 6/2005 | Hashimoto et al. |
| 2005/0176538 A1 | 8/2005 | Morita |
| 2009/0069133 A1* | 3/2009 | Smart | 474/111 |
| 2009/0241291 A1* | 10/2009 | Smart | 16/342 |

FOREIGN PATENT DOCUMENTS

| | | | |
|---|---|---|---|
| DE | 1550752 | | 10/1969 |
| EP | 1045161 | | 10/2000 |
| EP | 1323949 | | 7/2003 |
| GB | 155646 | | 12/1920 |
| GB | 628803 | * | 9/1948 |
| GB | 628803 | | 9/1949 |
| GB | 989582 | | 4/1965 |
| GB | 1077715 | | 8/1967 |
| GB | 2069656 | | 8/1981 |
| GB | 2259964 | | 3/1993 |
| JP | 1131324 | | 5/1989 |
| JP | 6010556 | | 1/1994 |
| JP | 6193693 | | 7/1994 |
| JP | 6193694 | | 7/1994 |
| JP | 8336809 | | 12/1996 |
| JP | 2001355688 | | 12/2001 |
| JP | 2002098205 | | 4/2002 |
| JP | 2005155795 | | 6/2005 |
| JP | 2005155796 | | 6/2005 |
| JP | 2005155833 | | 6/2005 |

OTHER PUBLICATIONS

PCT Search Report; PCT/US2007/060941; May 15, 2007, 10 pages.

PCT Search Report; PCT/US2007060947; Aug. 27, 2008; 16 pages.

* cited by examiner

Fig. 1

Comparison of Single vs. Double Blade Springs

PRIOR ART

US 8,007,386 B2

BLADE TENSIONER WITH OPPOSING SPANS

REFERENCE TO RELATED APPLICATIONS

This application is a continuation in part of copending parent application PCT/US2007/060945, filed Jan. 24, 2007, entitled, "Self-Energizing Brake For A Tensioner and copending parent application PCT/US2007/060947, filed Jan. 24, 2007, entitled, "Torque Biased Friction Hinge For A Tensioner". The aforementioned application(s) are hereby incorporated herein by reference.

This application also claims one or more inventions which were disclosed in Provisional Application No. 60/822,520, filed Aug. 16, 2006, entitled "Self-Energizing Brake For A Tensioner, Provisional Application No. 60/863,815, filed Nov. 1, 2006, entitled "Blade Tensioner With Opposing Spans" and Provisional Application No. 60/765,777, filed Feb. 7, 2006, entitled "Torque Biased Friction Hinge For A Tensioner". The benefit under 35 USC §119(e) of the United States provisional application is hereby claimed, and the aforementioned applications are hereby incorporated herein by reference.

BACKGROUND OF THE INVENTION

1. Field of the Invention

The invention pertains to the field of blade tensioners. More particularly, the invention pertains to a blade tensioner with opposing spans coupled by a pin joint.

2. Description of Related Art

Chain tensioners in engines are used to control power transmission chains as the chains travels around a plurality of sprockets. The length of the chain varies as the temperature in an engine increases and as the chain wears. When a chain wears, the chain elongates and the slack in the chain increases. The increase in slack may cause noise, slippage, or tooth jumping between the chain and the sprocket teeth. If the increase of the slack of the chain is not taken up, by a tensioner, for example in an engine with a chain driven camshaft, the engine may be damaged because the camshaft timing is misaligned by several degrees due to slippage or tooth jumping.

The tensioning of the chain varies as the blade spring, the tensioner, and the chain wear. Preload, the nominal chain tension applied to the chain by a tensioner, under static conditions is imparted to the chain by the tensioner. In the case of a blade spring tensioner, the preload or nominal tension, under static conditions, decreases as the chain wears. The decrease in preload is caused by the blade spring becoming closer to its rest length as the tensioner extends to take up chain wear.

Figure 8:
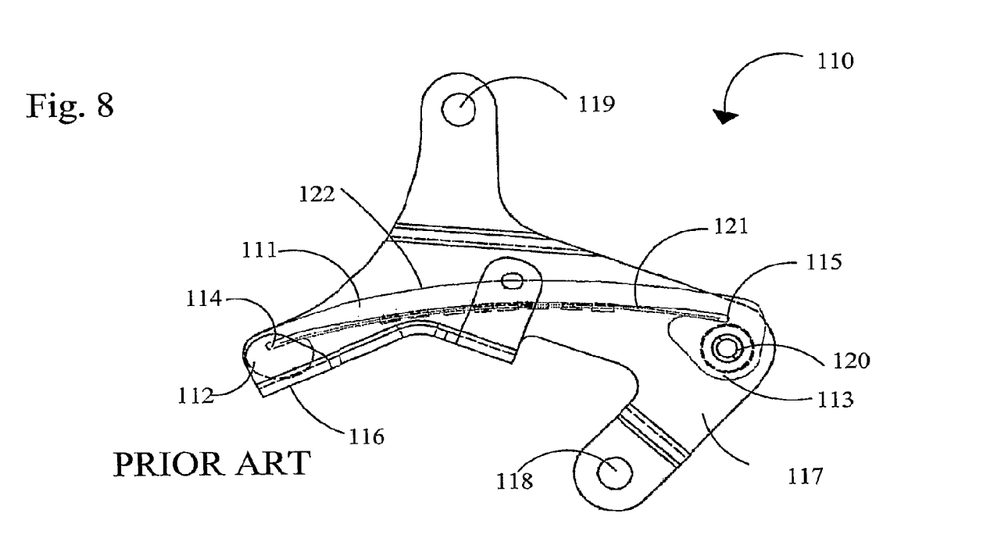
FIG. 8 shows a schematic of a prior art single blade tensioner.

Prior art FIG. 8 is an example of a single blade tensioner. The conventional blade tensioner 110 includes a single blade shoe 111 made of resin having a curved chain sliding face 122 and numerous blade springs 121, preferably made of metallic material. The blade springs 121 are arranged in layers on the opposite side of the blade shoe 111 from the chain sliding face 122, and provide spring force to the blade shoe 111. The ends of each spring-shaped blade spring 121 are inserted in the indented portions 114 and 115, which are formed in the distal portion 112 and proximal portion 113 of the blade shoe 111, respectively.

A bracket 117 is provided for mounting the blade tensioner 110 in an engine. Holes 118 and 119 are formed in the bracket 117, and mounting bolts are inserted into these holes 118 and 119. A sliding face 116 contacts the distal portion of the blade shoe 111 and permits sliding. The sliding face 116 is formed on the distal portion of the bracket 117. A pin 120 supports the proximal portion 113 of the blade shoe 111 so that it may move in either direction. The pin 120 is secured on the bracket 117.

Simpson's U.S. Pat. No. 5,462,493 discloses a blade tensioner having two shoes and a blade spring, with one shoe imparting tension to a chain and overlapping the other shoe, which is connected to the blade spring. The two shoes are not directly connected to each other.

Simpson's U.S. Pat. No. 5,653,652 discloses a tensioner having two tensioner arms, with one tensioner arm imparting tension to a chain and overlapping the other arm. A hydraulic tensioner applies force against the free end of the overlapping tensioner arms. The tensioner arms may have blade springs. As one of tensioner arms applies a force to the chain, the other arm damps the movement of the first arm.

Tada's U.S. Pat. No. 6,044,020 discloses a blade type tensioner that includes a blade shoe with a chain sliding face, a blade spring for biasing the shoe toward the chain, and a bracket to rotatably support the fixed end of the blade shoe. The blade spring length is shorter than the chain sliding face. The first end of the blade spring is attached to the fixed end of the blade shoe and slidably contacts the distal end of the bracket, at a contact point located between the fixed end and the free end of the shoe.

Tada's U.S. Pat. No. 6,612,953 discloses a blade type tensioner that includes a blade shoe with a chain sliding face, a blade spring for biasing the shoe toward the chain, and a bracket to rotatably support the fixed end of the blade shoe. The blade spring length is shorter than the chain sliding face. The first end of the blade spring is attached the tip of the distal end of the shoe. The middle portion of the blade spring contacts the bracket.

Therefore, there is a need in the prior art for a blade tensioner that takes into account preload and chain wear.

SUMMARY OF THE INVENTION

A tensioner for tensioning a strand of chain between two sprockets including a tensioner body and a ramp fixed to ground. The tensioner body has an oval shape defined by first and second arcuately curved sides. Each side has a distal end, a proximal end, and a blade spring. The first and second arcuately curved sides are coupled together at the distal ends and pivotally attached to ground at the proximal ends. When the first arcuately curved side is in contact with the ramp, the second arcuately curved side is in contact with the chain strand, and the chain strand and the tensioner body are positioned relative to the ramp such that the blade springs of the tensioner body are compressed, and a tensioning force is applied to the strand of chain.

A sliding surface of the ramp in contact with the arcuately curved side of the tensioner body may be flat or angled. The ramp sliding surface may also be textured to allow limited movement of the second arcuately curved side in one direction and free movement in the other direction.

Ground may be an engine block, a fixed bracket, transmission case, or frame of a chain drive.

The first arcuately curved side may be longer in length than the second arcuately curved side.

The second arcuately curved side may be thicker than the first arcuately curved side.

The proximal end of the first arcuately curved side may be bifurcated and receive the protruding end of the proximal end of the second arcuately curved side. The proximal ends of the first and second arcuately curved sides receive a pin, which fixes the ends to ground. The proximal ends of the first and second arcuately curved sides may rotate relative to ground and each other.

The distal end of the second arcuately curved side may be bifurcated and receive the protruding end of the distal end of the first arcuately curved side. The distal ends of the first and second arcuately curved sides receive a pin and the ends are secured with the pin and a retaining means. The distal ends of the first and second arcuately curved sides rotate relative to each other and may also move laterally relative to ground. Alternatively, the distal end of the arcuately curved side may not use any retaining means or pins.

The tensioner body may also be one piece. The one piece tensioner body has flanges protruding from the distal ends towards the proximal ends of the arcuately curved sides.

DETAILED DESCRIPTION OF THE INVENTION

Figure 2A:
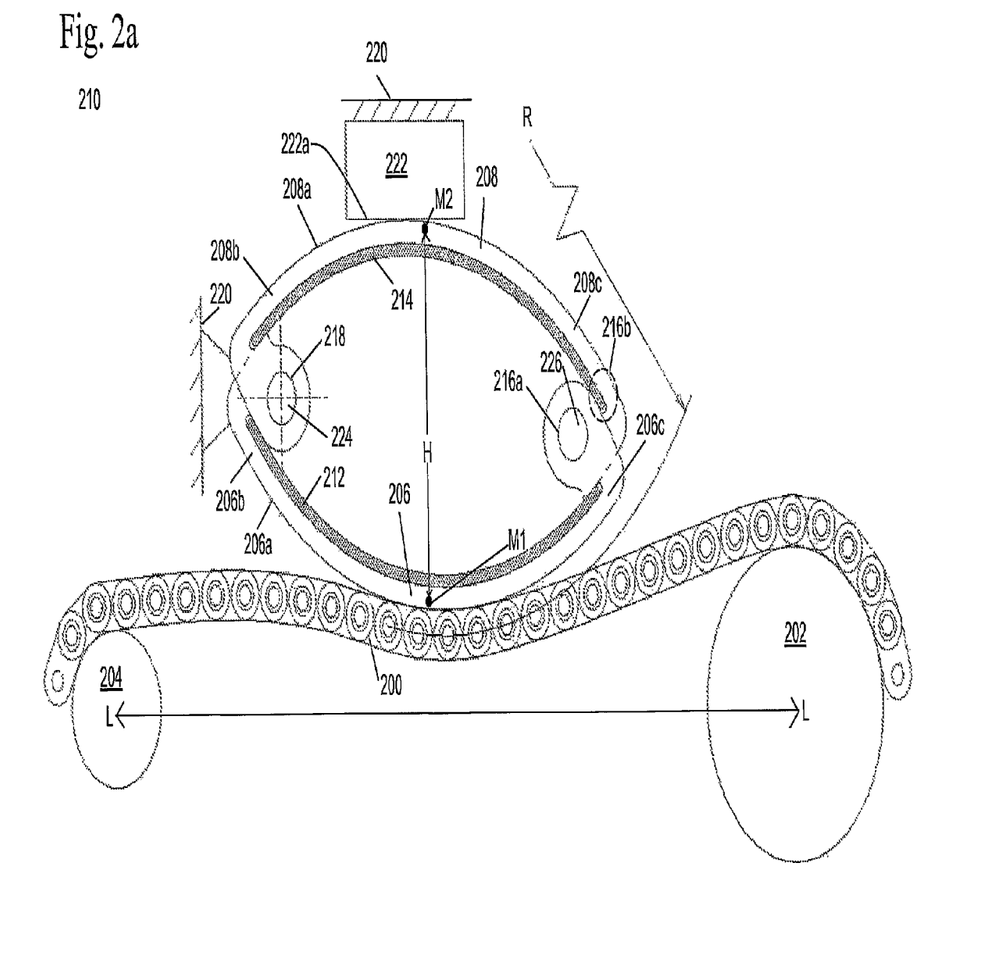
FIG. 2a shows a schematic of the tensioner of a first embodiment with a chain, where the chain strand radius of the chain in contact with the tensioner is decreasing or shortening.
Figure 2B:
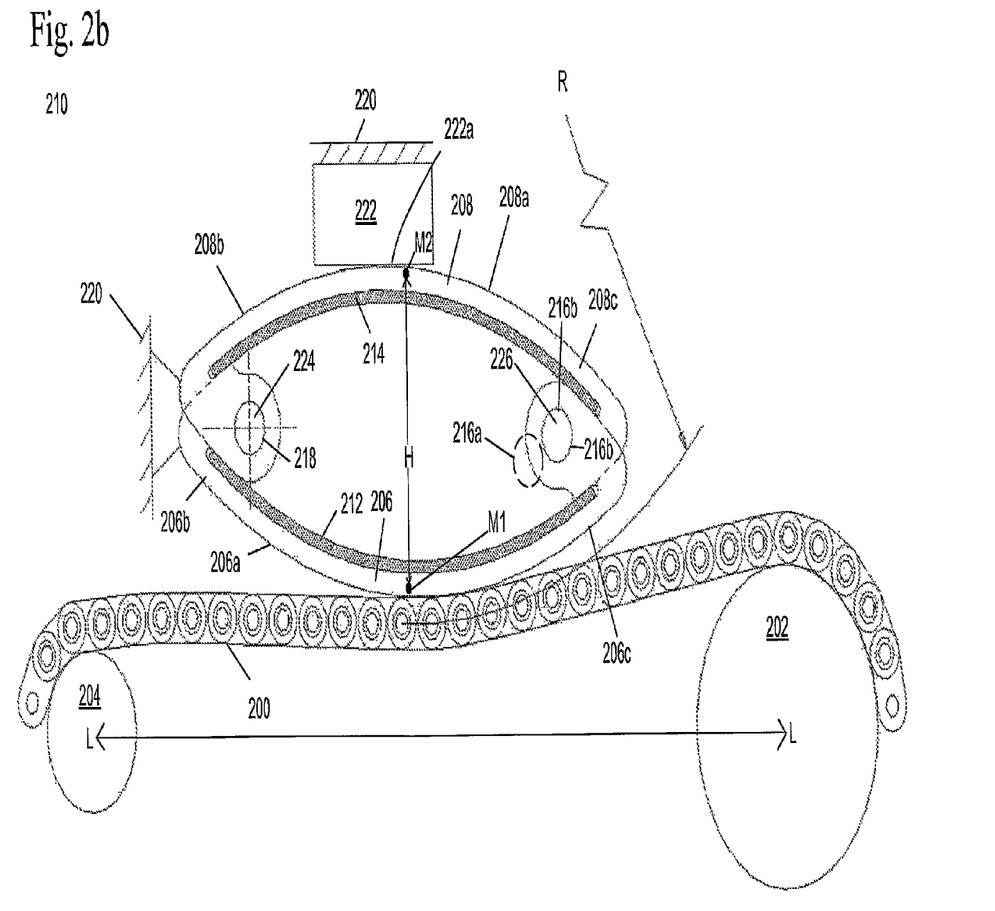
FIG. 2b shows a schematic of the tensioner of a first embodiment with a chain, where the chain strand radius of the chain in contact with the tensioner is increasing or lengthening.

FIGS. 2a and 2b show a schematic of the tensioner 210 of the first embodiment with a chain 200. The chain is wrapped around a drive sprocket 204 and a driven sprocket 202 creating a chain strand between each of the sprockets 202, 204. The chain strands each have a radius of curvature R where the tensioner 210 contacts the chain strand. A line L-L extends between the center of rotation of sprockets 202 and 204.

The tensioner 210 is comprised of an oval shaped tensioner body with a first flexible blade shoe or first arcuately curved surface 206 and a second flexible blade shoe or second arcuately curved surface 208 preferably made of a polymer material. The first blade shoe 206 has an arcuately curved chain sliding face 206a for contacting a strand of the chain, a distal end 206c, a proximal end 206b, and a midpoint M1. The second blade shoe 208 has a distal end 208c, a proximal end 208b, a midpoint M2, and an arcuately curved ramp sliding surface 208a that contacts a ramp 222 fixed to ground 220. The distance between the midpoint M1 of the first blade shoe and the midpoint M2 of the second blade shoe is defined as height or distance H.

Figure 7A:
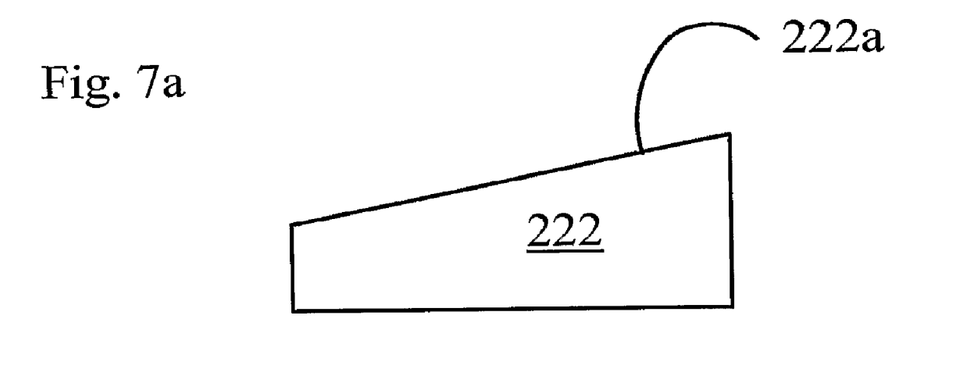
FIG. 7a shows a first example of a ramp used with the tensioners of the present invention.
Figure 7B:
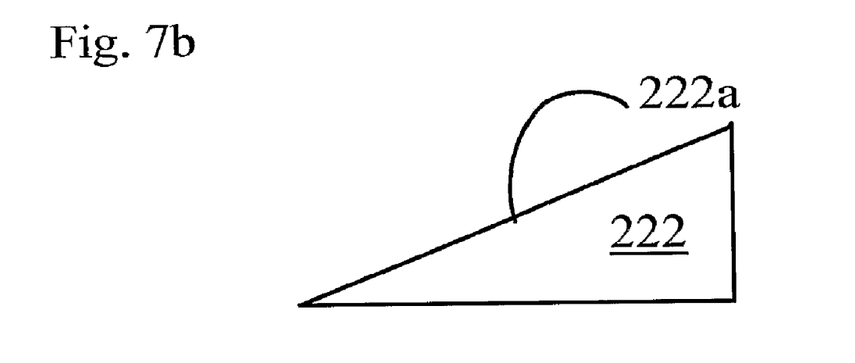
FIG. 7b shows a second example of a ramp used with the tensioners of the present invention.
Figure 7C:
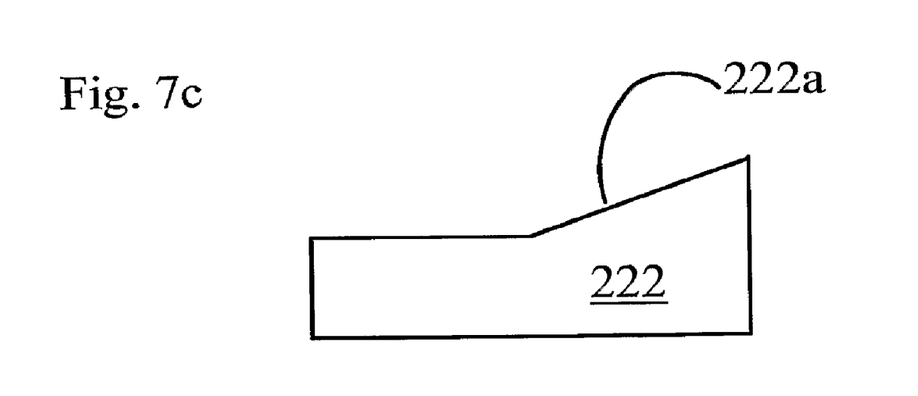
FIG. 7c shows a third example of a ramp used with the tensioners of the present invention.

Both the first blade shoe 206 and the second blade shoe 208 each receive a blade spring 212, 214, which runs along the length of the blade shoe (i.e. from the distal end to the proximal end). The blade spring 212, 214 may consist of a single blade spring or multiple blade springs. The ramp 222, fixed to ground 220, may have a flat ramp surface 222a as shown in FIGS. 2a and 2b, or an angled ramp surface as shown in FIGS. 7a through 7c.

The proximal end 206b of the first blade shoe 206 and the proximal end 208b of the second blade shoe 208 are joined together by pin 224 forming a pivot joint 218, which is fixed to ground 220. Ground 220 may be an engine block, a fixed bracket, transmission case, or any other frame of the chain drive. As used herein, the term "ground" is defined as the object or set of objects that the tensioning device is mounted to and is nonmoving relative to the shaft center line of the chain drive. The distal end 206c of the first blade shoe 206 and the distal end 208c of the second blade shoe 208, are joined together by a pin 226 forming free pivot joint 216.

Figure 6A:
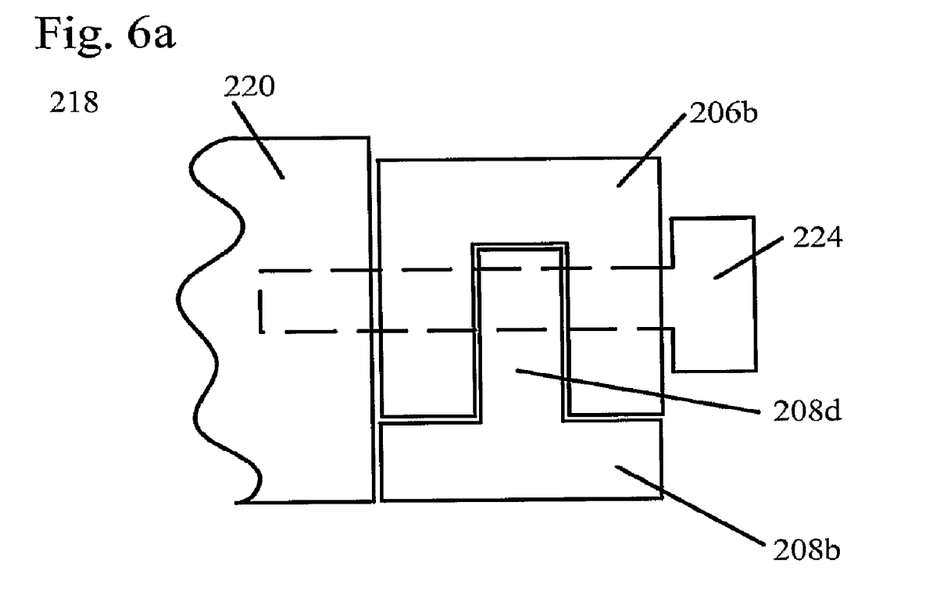
FIG. 6a shows a section of FIG. 2a of the pivoting joint fixed to ground.

FIG. 6a shows a cross-section of joint 218 preferably used with the tensioner in FIGS. 2a and 2b. The proximal end 206b of the first blade shoe 206 is bifurcated and receives the protruding end 208d of the proximal end 208b of the second blade shoe 208. Pin 224 passes through the bifurcated proximal end 206b of the first blade shoe 206, and the protruding end 208b of the proximal end 208 of the second blade shoe 208, and into ground, fixing the pivot joint 218. The fixed pivot joint 218, allows the proximal ends 206b, 208b of both the first and second blade shoes 206, 208 to rotate relative to ground 220 and relative to each other, but prevents lateral motion of the proximal ends 206b, 208b of the first and second blade shoes 206, 208 relative to the ground 220 or to each other. Other joints may be used in connected the proximal end 208b of the second blade shoe 208 to the proximal end 206b of the first blade shoe 206. The joint is not limited to the joint shown in FIG. 6a.

Figure 6B:
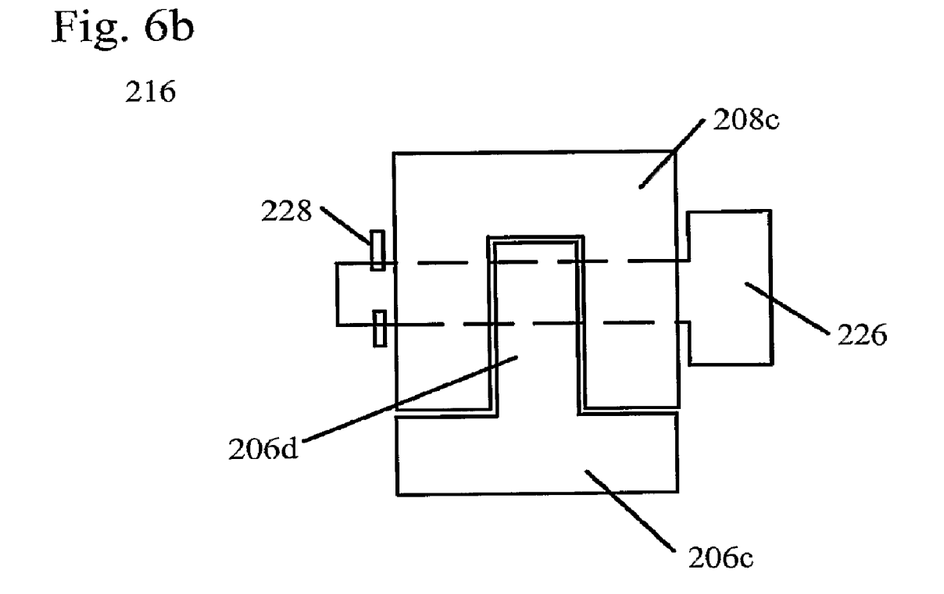
FIG. 6b shows a section of FIG. 2a of the free pivoting joint.

FIG. 6b shows a cross-section of joint 216 preferably used with the tensioner in FIGS. 2a and 2b. The distal end 208c of the second blade shoe 208 is bifurcated and receives the protruding end 206d of the distal end 206c of the first blade shoe 206. Pin 226 passes through the bifurcated distal end 208c of the second blade shoe 208, and has a retaining means 228, preventing the pin 226 from dislodging from the first blade shoe 206 and the second blade shoe 208. Since the joint 216 is not fixed to ground, the joint 216 may freely pivot. Joint 216 allows no relative lateral motion between the distal end 206c of the first blade shoe 206 and the distal end 208c of the second blade shoe 208, but does allow lateral motion between the joint and ground and the first blade shoe 206 and the second blade shoe 208 to rotate relative to each other. Other joints may be used in connected the distal end 208c of the second blade shoe 208 to the distal end 206c of the first blade shoe 206. The joint is not limited to the joint shown in FIG. 6b.

When the radius of the chain strand 200 between the two sprockets 202, 204, contacting the arcuately curved chain sliding face 206a of the first blade shoe 206 increases or lengthens as shown in FIG. 2b, the first blade shoe 206 is compressed by the chain strand 200 and the second blade shoe 208 is compressed against the ramp surface 222a of the ramp 222, decreasing the height or distance H between the midpoints M1, M2 of the first and second blade shoes 206, 208 relative to the position of the blade shoes 206, 208 of the tensioner 210 and height H in FIG. 2a. As the first and second blade shoes 206, 208 are being compressed towards each other, the distal ends 206c, 208c of the first and second blade shoes 206, 208 pivot on pin 226 of joint 216 and the proximal ends 206b, 208b of the first and second blade 206, 208 shoes pivot on pin 224 of joint 218, such that joint 216 moves away from line L-L linking the centers of rotation of sprockets 202 and 204 and longitudinally along a slight inclined axis from position 216a shown as a dashed circle to position 216b shown as a solid circle in FIG. 2b. In moving towards the ramp 222 and away from line L-L, the ramp sliding surface 208a of the second blade shoe 208 slides along the ramp surface 222a. The ramp surface 222a may have a friction surface, be angled at a certain degree, as shown in FIGS. 7a through 7c or other means, to allow limited travel of the ramp sliding surface 208a of the second blade shoe 208 on the ramp 222 in a certain direction, tensioning the chain.

When the radius of the chain strand 200 between the two sprockets 202, 204 contacting the arcuately curved chain sliding face 206a of the first blade shoe 206 decreases or shortens as shown in FIG. 2a, the first blade shoe 206 and the second blade shoe 208 decompress, increasing the height or distance H between the midpoints M1, M2 of the first and second blade shoes 206, 208 relative to the position of the blade shoes 206, 208 of the tensioner 210 and height H in FIG. 2b. As the first and second blade shoes 206, 208 are decompressing away from each other, the first and second blade shoes 206, 208 pivot on pin 226 of joint 216 and the proximal ends 206b, 208b of the first and second blade 206, 208 shoes pivot on pin 224 of joint 218, such that the joint 216 moves towards line L-L linking the centers of rotation of sprockets 202 and 204 and longitudinally along a slight inclined axis from position 216b indicated by a dashed circle to position 216a indicated by a solid circle as shown in FIG. 2a. In moving away from ramp 222 and towards line L-L, the tensioner tensions the chain.

Figure 3:
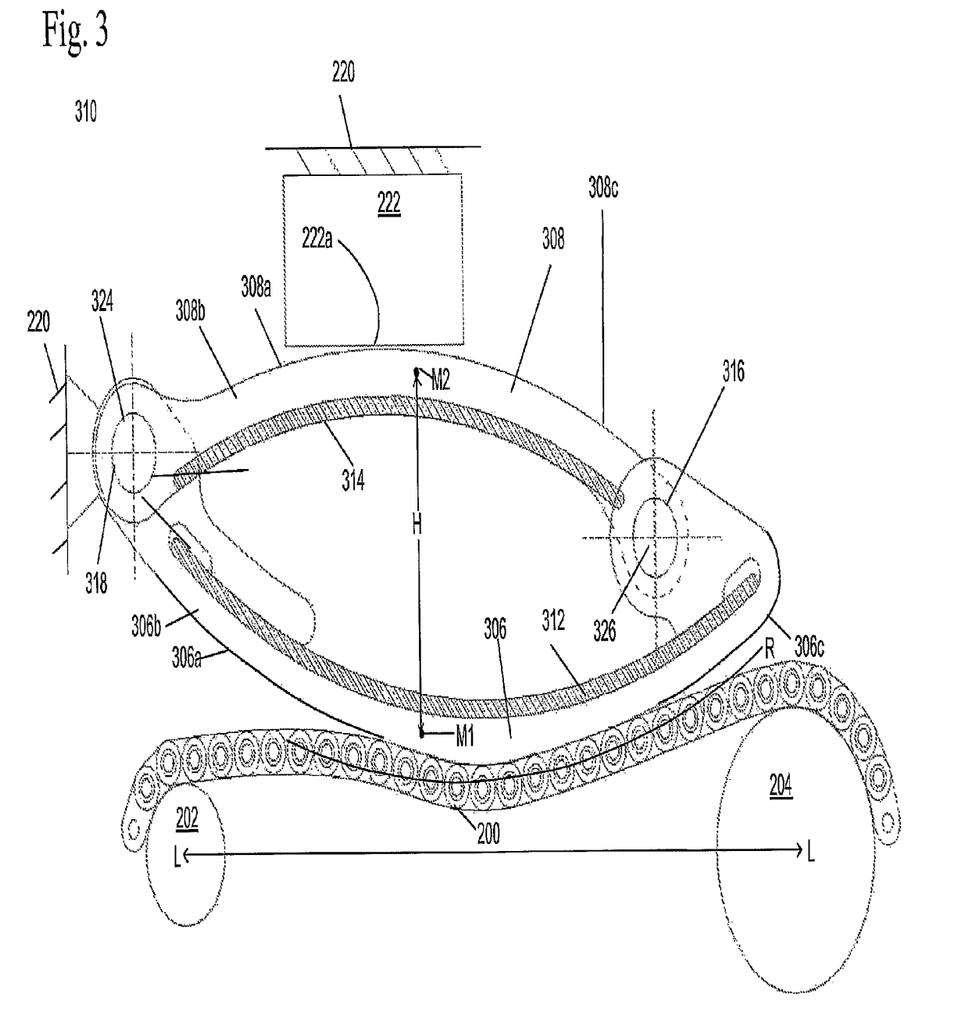
FIG. 3 shows a schematic of the tensioner of a second embodiment with a chain, in which one of the blade shoes or arcuately curved sides is longer than the other.

FIG. 3 shows an alternate embodiment, in which the first blade shoe 306 is longer in length then the second blade shoe 308. By increasing the length of the first blade shoe 306, the length of the chain sliding surface 306a increases, increasing the surface contact of the first blade shoe 306 with the chain 200. The chain 200 is wrapped around a drive sprocket 204 and a driven sprocket 202 creating a chain strand between each of the sprockets 202, 204. The chain strands each have a radius of curvature R where the blade tensioner 310 contacts the chain strand. A line L-L extends between the center of rotation of sprockets 202 and 204.

The blade tensioner 310 is similar to the blade tensioner 210 shown in FIGS. 2a and 2b, in that the oval shaped tensioner body is comprised of a first flexible blade shoe or a first arcuately curved side 306 and a second flexible blade shoe or a second arcuately curved side 308, preferably made of a polymer material. The first blade shoe 306 has an arcuately curved chain sliding face 306a for contacting a strand of the chain, a distal end 306c, a proximal end 306b, and a midpoint M1. The second blade shoe 308 has a distal end 308c, a proximal end 308b, a midpoint M2, and an arcuately curved ramp sliding surface 308a that contacts a ramp 222 fixed to ground 220. The distance between the midpoint M1 of the first blade shoe and the midpoint M2 of the second blade shoe is defined as height or distance H.

Both the first blade shoe 306 and the second blade shoe 308 each receive a blade spring 312, 314, which runs along the length of the blade shoe (i.e. from the distal end to the proximal end). The blade spring 312, 314 may consist of a single blade spring or multiple blade springs. The ramp 222, fixed to ground 220, may have a flat ramp surface 222a as shown in FIG. 3 or an angled ramp surface 222a as shown in FIGS. 7a through 7c.

The proximal end 306b of the first blade shoe 306 and the proximal end 308b of the second blade shoe 308 are joined together by pivot joint 318, which is fixed to ground 220. Ground 220 may be an engine block, a fixed bracket, transmission case, or any other frame of the chain drive. As used herein, the term "ground" is defined as the object or set of objects that the tensioning device is mounted to and is non-moving relative to the shaft center line of the chain drive. The distal end 306c of the first blade shoe 306 and the distal end 308c of the second blade shoe 308, are joined together by a free pivot joint 316. The pivot joint 316 is completely covered by the increased length of the first blade shoe 306, such that the chain 200 has increased surface contact with the chain sliding surface 306a of the first blade shoe 306 and the chain 200 does not ride on the pivot joint 316. The joints 316, 318 are preferably similar to those shown in FIGS. 6a and 6b, but are not limited to those joints shown.

The movement and tensioning of the chain strand by the blade tensioner 310 is similar to movement and tensioning of the blade tensioner 210 as described above in reference to FIGS. 2a and 2b.

When the radius of chain strand 200 between the two sprockets 202, 204 contacting the arcuately curved chain sliding face 306a of the first blade shoe 306 increases or lengthens as shown in FIG. 3, the first blade shoe 306 is compressed by the chain strand 200 and the second blade shoe 308 is compressed against the ramp surface 222a of the ramp 222, decreasing the height or distance between midpoints M1, M2 of the first and second blade shoes 306, 308, similar to FIG. 2b. As the first and second blade shoes are being compressed towards each other, the distal ends 306c, 308c of the first and second blade shoes 306, 308 pivot on pin 326 of joint 316, such that the joint 316 moves away from line L-L linking the centers of rotation of sprockets 202 and 204 and longitudinally along a slight inclined axis as shown in FIG. 2b. In moving towards the ramp 222 and away from line L-L, the ramp sliding surface 308a of the second blade shoe 308 slides along the ramp surface 222a. The ramp surface 222a may have a friction surface, be angled at a certain degree, as shown in FIGS. 7a through 7c or other means, to allow limited travel of the ramp sliding surface 308a of the second blade shoe 308 on the ramp 222 in a certain direction.

When the radius of the chain strand 200 between the two sprockets 202, 204 contacting the arcuately curved chain sliding face 306a of the first blade shoe 306 decreases or shortens (not shown, but similar to FIG. 2a), the first blade shoe 306 and the second blade shoe 308 decompress, increasing the height or distance H between the midpoints M1, M2 of the first and second blade shoes 306, 308. As the first and second blade shoes 306, 308 are decompressing away from each other, the first and second blade shoes 306, 308 pivot on pin 326 of joint 316, such that the joint 316 moves towards line L-L linking the centers of rotation of sprockets 202 and 204 and longitudinally along a slight inclined axis (not shown, but similar to FIG. 2a). In moving away from ramp 222 and towards line L-L, the tensioner tensions the chain.

Figure 4:
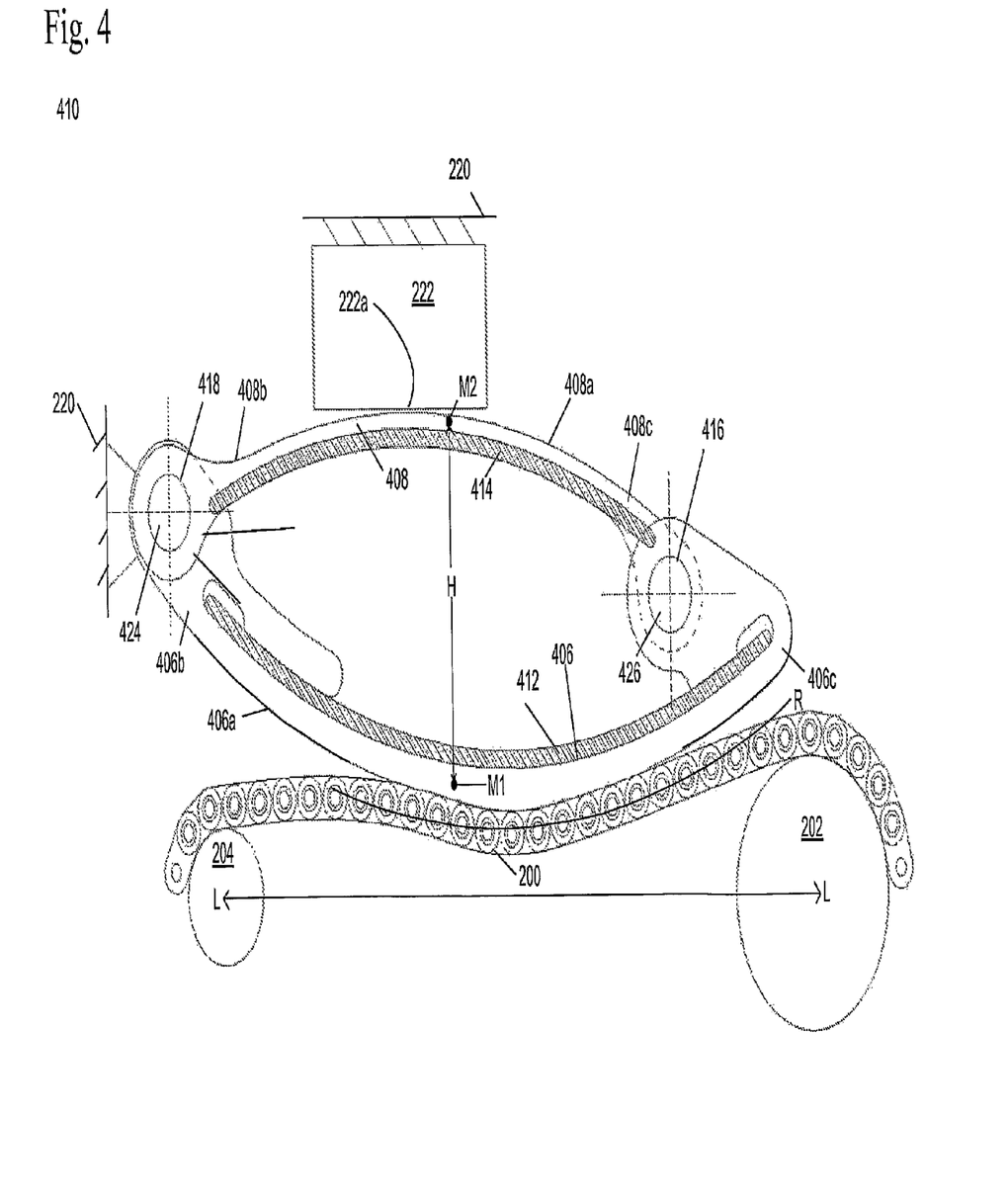
FIG. 4 shows the schematic of the tensioner of the third embodiment, in which one of the arcuately curved sides is a greater thickness than the other.

FIG. 4 shows another embodiment of a tensioner 410 with a chain 200. The chain 200 is wrapped around a drive sprocket 204 and a driven sprocket 202 creating a chain strand between each of the sprockets 202, 204. The chain strands each have a radius of curvature R where the blade tensioner contacts the strand. A line L-L extends between the centers of rotation of sprockets 202 and 204. The tensioner 410 shown in FIG. 4 has a second blade shoe or second arcuately curved side 408 that is made of a thinner wear resistant plastic material then the first blade shoe or first arcuately curved side 406. By having a thicker wear resistant plastic material for the first blade shoe 406, the arcuately curved chain sliding face 406a may withstand wear due to contact with the chain traveling at a high velocity. The second arcuately curved side 408 has reduced wear requirements in comparison to the first arcuately curved side 406 and allows the use of a thinner or softer polymer material to aid in tuning the damping of the tensioner to the desired level. The length of the first blade shoe 406 is also longer than the second blade shoe 408, similar to the tensioner in FIG. 3. Alternatively, the first and second blade shoes 406, 408 may be the same length.

The first blade shoe 406 has an arcuately curved chain sliding face 406a for contacting a strand of the chain, a distal end 406c, a proximal end 406b, and a midpoint M1. The second blade shoe has a distal end 408c, a proximal end 408b, a midpoint M2, and an arcuately curved ramp surface 408a that contacts a ramp 222 fixed to ground 220. The distance between the midpoint M1 of the first blade shoe and the midpoint M2 of the second blade shoe is defined as height or distance H.

Both the first blade shoe 406 and the second blade shoe 408 each receive a blade spring 412, 414, which runs along the length of the blade shoe (i.e. from the distal end to the proximal end). The blade spring 412, 414 may consist of a single blade spring or multiple blade springs. The ramp 222, fixed to ground 220, may have a flat ramp surface, as shown in FIG. 4 or an angled ramp surface 222a as shown in FIGS. 7a through 7c.

The proximal end 406a of the first blade shoe 406 and the proximal end 408b of the second blade shoe 408 are joined together by pivot joint 418, which is fixed to ground 220. Ground 220 may be an engine block, a fixed bracket, transmission case, or any other frame of the chain drive. As used herein, the term "ground" is defined as the object or set of objects that the tensioning device is mounted to and is non-moving relative to the shaft center line of the chain drive. The distal end 406c of the first blade shoe 406 and the distal end 408c of the second blade shoe 408, are joined together by a free pivot joint 416. The pivot joint 416 is completely covered by the increased length of the first blade shoe 406, such that the chain 200 has increased surface contact with the chain sliding surface 406a of the first blade shoe 406 and the chain 200 does not ride on the pivot joint 416. The joints 416, 418 are similar to those shown in FIGS. 6a and 6b, but are not limited to the joints shown.

The movement and tensioning of the chain strand by the blade tensioner 410 is similar to movement and tensioning of the blade tensioner 210 as described above in reference to FIGS. 2a and 2b.

When the radius of chain strand 200 between the two sprockets 202, 204 contacting the arcuately curved chain sliding face 406a of the first blade shoe 406 increases or lengthens as shown in FIG. 4, the first blade shoe 406 is compressed by the chain strand 200 and the second blade shoe 408 is compressed against the ramp surface 222a of the ramp 222, decreasing the height or distance H between midpoints M1, M2 of the first and second blade shoes 406, 408, similar to FIG. 2b. As the first and second blade shoes are being compressed towards each other, the distal ends 406c, 408c of the first and second blade shoes 406, 408 pivot on pin 426 of joint 416 and the proximal ends 406b, 408b of the first and second blade 406, 408 shoes pivot on pin 424 of joint 418, such that the joint 416 moves away from line L-L linking the centers of rotation of sprockets 202 and 204 and longitudinally along a slight inclined axis as shown in FIG. 2b. In moving towards the ramp and away from line L-L, the ramp sliding surface 408a of the second blade shoe 408 sliding along the ramp surface 222a towards the chains strand. The ramp surface 222a may have a friction surface, be angled at a certain degree, as shown in FIGS. 7a through 7c or other means to allow limited travel of the ramp sliding surface 408a of the second blade shoe 408 on the ramp 222, in a certain direction.

When the radius of the chain strand 200 between the two sprockets 202, 204 contacting the arcuately curved chain sliding face 406a of the first blade shoe 406 decreases or shortens (not shown but similar to FIG. 2a), the first blade shoe 406 and the second blade shoe 408 decompress, increasing the height or distance H between the midpoints M1, M2 of the first and second blade shoes 406, 408. As the first and second blade shoes are decompressing away from each other, the first and second blade shoes, 406, 408 pivot on pin 426 of joint 416 and the proximal ends 406b, 408b of the first and second blade 406, 408 shoes pivot on pin 424 of joint 418, such that the joint 416 moves towards line L-L, linking the centers of rotation of sprockets 202 and 204 and longitudinally along a slight inclined axis (not shown, but similar to FIG. 2a). In moving away from ramp 222 and towards line L-L, the tensioner tensions the chain.

Figure 5A:
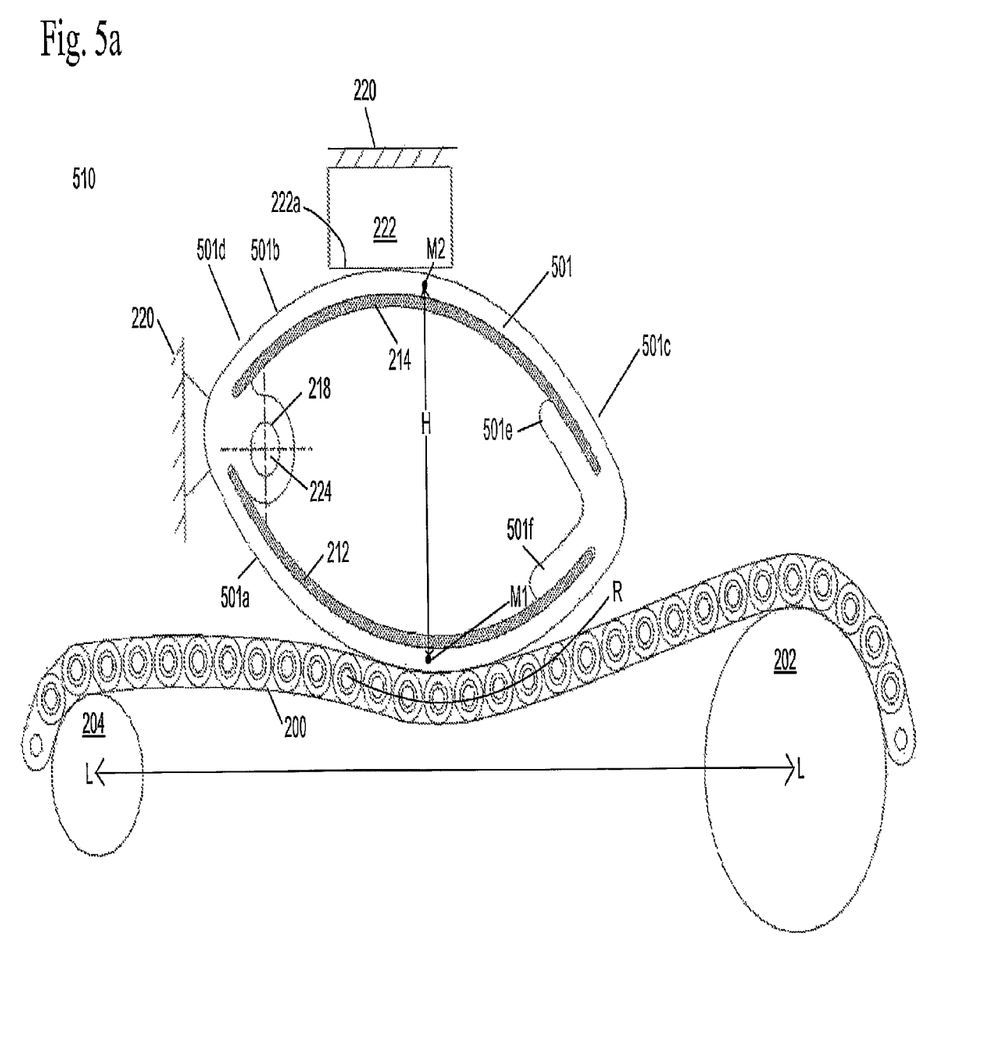
FIG. 5a shows a schematic of a tensioner of a fourth embodiment with a chain, where the chain strand radius of the chain in contact with the tensioner is decreasing.
Figure 5B:
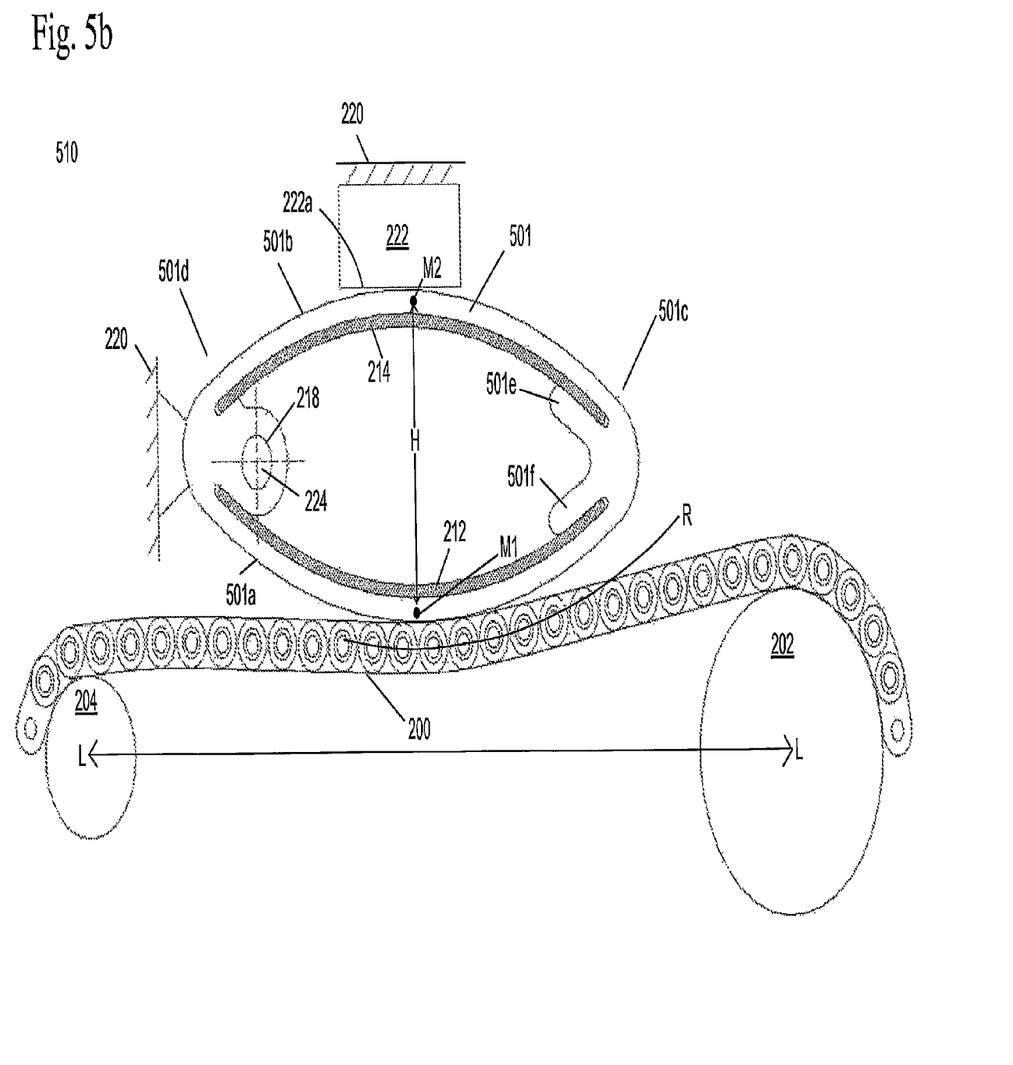
FIG. 5b shows a schematic of a tensioner of a fourth embodiment with a chain, where the chain strand radius of the chain in contact with the tensioner is increasing.

FIGS. 5a and 5b show a fourth embodiment of a blade tensioner of the present invention with a chain 200. The chain 200 is wrapped around a drive sprocket 204 and a driven sprocket 202 creating a chain strand between the sprockets 202, 204. The chain strands each have a radius of curvature R, where the blade tensioner contacts the chain strand. A line L-L extends between the center of rotation of sprockets 202 and 204.

The tensioner 510 is made of one oval shaped flexible tensioner body 501 preferably made by injection molding out of a polymer material and has two arcuately curved sliding surfaces 501a, 501b, each extending a length. The first sliding surface 501a contacts and slides on the chain strand 200. The second sliding surface 501b contacts and slides on the ramp sliding surface 222a of a ramp 222 fixed to ground. The first sliding surface 501a of the tensioner body 501 has a midpoint M1 and the second sliding surface 501b of the blade shoe piece 501 has a midpoint M2. The distance between the midpoint M1 of the first sliding surface 501b and the midpoint M2 of the second sliding surface 501b is defined as height or distance H.

The first sliding surface 501a and the second sliding surface 501b come together or meet at first end or proximal end 501d and the blade shoe piece 501 is fixed to ground 220 by pin 224 forming a fixed pivot 218. The first sliding surface 501a and the second sliding surface 501b also come together or meet at a second end or the distal end 501c, opposite the first end 501e. The first sliding surface 501a side and the second sliding surface 501b side of the blade shoe piece 501 each receive blade springs 212, 214 which extend a portion of the length of the sliding surfaces. The blade springs are held in place by flanges 501e, 501f that protrude out from the distal end 501c, towards the proximal end 501d. The blade springs 212, 214 may consist of a single blade spring or multiple blade springs. The ramp 222 may have a flat ramp surface 222a as shown in FIGS. 5a and 5b or an angled ramp surface 222a as shown in FIGS. 7a through 7c. The joint 218 may be the joint shown in FIG. 6a, but is not limited to just the joint shown.

When the radius of the chain strand 200 between the two sprockets 202, 204 contacting the first sliding face 501a increases or lengthens as shown in FIG. 5b, the first sliding surface 501a of the tensioner body 501 is compressed by the chain strand and the second sliding surface 501b of the tensioner body 501 is compressed against the ramp surface 222a of the ramp, decreasing the height or distance H between the midpoints M1, M2 of the first sliding face 501a and the second sliding face 501b relative to FIG. 5a. As the first and second sliding faces 501a, 501b are being compressed towards each other, the tensioner body 501 pivots on fixed joint 218, such that distal end 501c of the tensioner body moves away from line L-L linking the centers of rotation of sprockets 202 and 204 and longitudinally along a slight inclined axis from a position shown in FIG. 5a to the position shown in FIG. 5b. In moving towards the ramp 222 and away from line L-L, the second sliding surface 501b slides along the ramp surface 222a. The ramp surface 222a may have a friction surface, be angled at a certain degree, as shown in FIGS. 7a through 7c or other means to allow limited travel of the second sliding surface 501b on the ramp in a certain direction.

When the radius of the chain strand 200 between the two sprockets 202, 204 contacting the first sliding face 501a decreases or shortens in FIG. 5a, the first and second sliding surfaces 501a, 501b of the tensioner body 501 decompress, increasing the height or distance H between the midpoints M1, M2 relative to FIG. 5a. As the first and second sliding faces 501a, 501b are being decompressed, or moving away from each other, the tensioner body 501 pivots on pin 224 of fixed joint 218, such that distal end 501c of the tensioner body 501 moves towards line L-L linking the centers of rotation of sprockets 202 and 204, and longitudinally along a slight inclined axis from a position shown in FIG. 5b to the position shown in FIG. 5a. In moving away from ramp 222 and towards line L-L, the tensioner tensions the chain.

Ground 220 may be an engine block, a fixed bracket, transmission case, or any other frame of the chain drive. As used herein, the term "ground" is defined as the object or set of objects that the tensioning device is mounted to and is non-moving relative to the shaft center line of the chain drive.

The ramp 222 may be different shapes, such as a flat surface as shown in FIGS. 2a through 5b, or may be angled as shown in FIGS. 7a through 7c. The ramp 222 may include a friction surface that easily allows travel in one direction and resists travel in the opposite direction. FIGS. 7a and 7b show ramps with angled surfaces. FIG. 7c shows a ramp with a compound angled surface, similar to the sliding surface shown in US 2003-0125144, entitled "Blade-Type Chain Tensioner System," which is hereby incorporated by reference. Furthermore, the ramp may be placed anywhere along the second blade shoe to contact the ramp sliding surface.

The first blade shoe or the first arcuately curved side and the second blade shoe and the second arcuately curved side, of the above embodiments or similarly, the first and second sliding faces may be made of identical pieces or surfaces, as in the first embodiment, to decrease manufacturing costs or different pieces as shown in FIGS. 3 and 4.

The blade spring of the first blade shoe may have a spring rate that is equal to, less than, or greater than the spring rate of the blade spring of the second blade shoe.

Figure 1:
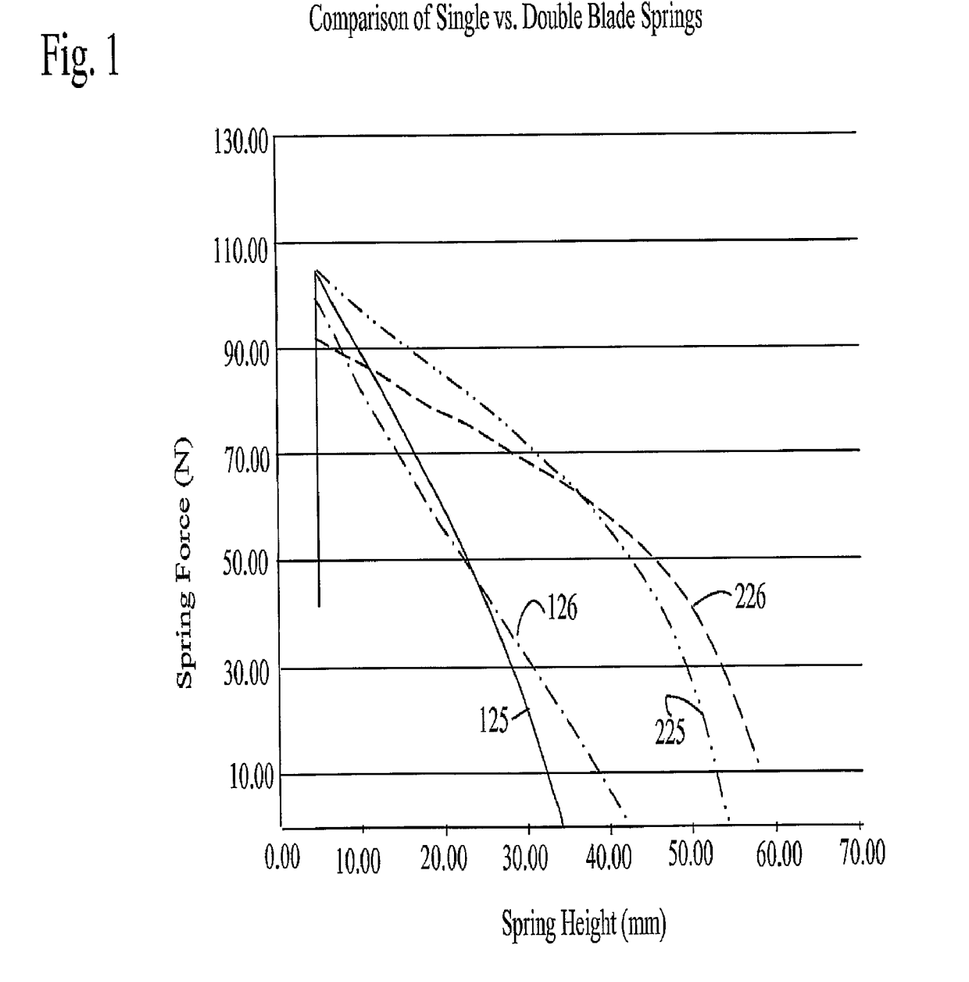
FIG. 1 shows a graph comparing a single tensioner arm with blade springs versus dual tensioning arms with blade springs.

FIG. 1 shows a graph of single vs. double blade springs tensioners with ramps 222 or sliding faces 116 with different surface geometries, for example flat or angled. The solid line 125 shows the spring force and spring height of a single blade shoe with a blade spring as in prior art FIG. 8 with a flat sliding face 116. By angling the sliding surface relative to the pivot (not shown), for example by 30 degrees, shown by dash dot line 126, the spring rest height increases. Furthermore, the slope of the dash dot line 126 of the single blade tensioner with an angled sliding surface has a more gradual slope than solid line 125 with the flat sliding surface, allowing a more constant preload on the single blade tensioner to be applied as the tensioner tensions the chain during new and worn chain conditions.

Dash dot dot line 225 shows the double blade shoe tensioner 210 of the present invention with a flat ramp 222. The dashed line 226 shows the double blade shoe tensioner 210 with an angled ramp 222, for example by 30 degrees, as shown in FIGS. 7a through 7c, and it has the highest spring height with the greatest spring force.

The slope of the dashed line 226 of the double blade tensioner with an angled ramp has a more gradual slope than dash dot dot line 225 with the flat sliding surface, as shown in FIGS. 2a through 5b, allowing a more constant preload on the double blade tensioner during new and worn chain conditions. Furthermore, by having two blade shoes 206, 208, each with their own blade springs 212, 214 pivotally connected at both ends 216, 218, putting the springs in series, allows the springs to be made with a lower stiffness and greater extension than a single blade shoe tensioner. By having the lower stiffness and greater extension, the preload present between new chain conditions and worn chain conditions would be reduced and more constant.

Another joint that may be used as the fixed joint for any of the above embodiments is the torque biased friction hinge disclosed in U.S. Provisional Patent Application No. 60/765,777, which was filed on Feb. 7, 2006, entitled, "TORQUE BIASED FRICTION HINGE FOR A TENSIONER" and is herewith incorporated by reference.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A tensioner for tensioning a strand of chain between two sprockets comprising:
    a tensioner body with an oval shape defined by a first arcuately curved side and a second arcuately curved side, each side having a distal end and a proximal end and blade springs, wherein the two arcuately curved sides are coupled at the distal ends and pivotally attached to a ground at the proximal ends; and
    a ramp fixed to the ground contacting the tensioner body;
    wherein when the second arcuately curved side of the tensioner body is in contact with the ramp fixed to the ground and the first curved surface of the tensioner body is in contact with the strand of chain and wherein the second arcuately curved side of the tensioner body slides along the ramp to a position relative to the ramp, such that the blade springs of the tensioner body are compressed, and a tensioning force is applied to the strand of chain.

2. The tensioner of claim 1, wherein the ground is an engine block, a fixed bracket, transmission case, or frame of a chain drive.

3. The tensioner of claim 1, wherein the first and second arcuately curved sides of the tensioner body are two separate pieces.

4. The tensioner of claim 3, wherein the distal ends of the first and second arcuately curved sides of the tensioner body are coupled together by a joint.

5. The tensioner of claim 1, wherein the first arcuately curved side and the second arcuately curved side are one piece.

6. The tensioner of claim 1, wherein the first arcuately curved side is longer in length than the second arcuately curved side.

7. The tensioner of claim 1, wherein the first arcuately curved side is thicker in width than the second arcuately curved side.

8. The tensioner of claim 1, wherein the first arcuately curved side and the second arcuately curves side are identical.

9. The tensioner of claim 1, wherein the ramp has a ramp contact surface for contacting the tensioner body.

10. The tensioner of claim 9, wherein the ramp contact surface is textured to allow limited movement of the tensioner body in one direction and free movement in an opposite direction.

11. The tensioner of claim 9, wherein the ramp contact surface is angled.

12. The tensioner of claim 9, wherein the ramp contact surface is flat.

13. The tensioner of claim 1, wherein the proximal end of the first arcuately curved side is bifurcated and receives a protruding end of the proximal end of the second arcuately curved side, the proximal ends of the first and second arcuately curved sides receiving a pin, fixing the proximal ends of the first and second arcuately curved sides to the ground, such that the proximal ends of the first and second arcuately curved sides rotate relative to the ground and to each other.

14. The tensioner of claim 1, wherein the distal end of the second arcuately curved side is bifurcated and receives a protruding end of the distal end of the first arcuately curved side, the distal end of the first and the second arcuately curved sides receiving a pin and secured to the first and second arcuately curved sides by a retaining means, such that the distal ends of the first and second arcuately curved sides rotate relative to each other and laterally between the first and second arcuately curved sides to the ground.

* * * * *